United States Patent [19]

Peterson

[11] Patent Number: 4,637,292
[45] Date of Patent: Jan. 20, 1987

[54] ROTARY LAUNCHER SYSTEM FOR AN AIRCRAFT

[75] Inventor: Paul F. Peterson, Rancho Palos Verdes, Calif.

[73] Assignee: Lockheed Corporation, Calabasas, Calif.

[21] Appl. No.: 812,565

[22] Filed: Dec. 23, 1985

[51] Int. Cl.$^4$ .............................................. F41F 3/06
[52] U.S. Cl. .................................. 89/1.804; 89/1.815
[58] Field of Search ................. 89/1.815, 1.802–1.804, 89/1.816, 1.819, 1.8; 244/137 R

[56] References Cited

U.S. PATENT DOCUMENTS

| | | | |
|---|---|---|---|
| 2,440,723 | 5/1948 | MacDonald | 89/1.804 |
| 2,447,941 | 8/1948 | Imber et al. | 102/393 |
| 2,646,786 | 7/1953 | Robertson | 89/1.51 X |
| 2,826,120 | 3/1958 | Lang et al. | 89/1.804 |
| 3,228,295 | 1/1966 | Kane et al. | 89/1.802 |
| 4,040,334 | 8/1977 | Smethers | 89/1.804 |
| 4,208,949 | 6/1980 | Boilsen | 89/1.801 |
| 4,318,328 | 3/1982 | Rona | 89/1.815 |
| 4,333,384 | 6/1982 | Arnold | 89/1.803 |
| 4,409,880 | 10/1983 | Fetterly | 89/1.804 |
| 4,475,436 | 10/1984 | Campbell | 89/1.804 |

*Primary Examiner*—David H. Brown
*Attorney, Agent, or Firm*—Louis L. Dachs

[57] ABSTRACT

The invention is a rotary launcher system for an aircraft having a weapon bay with an opening in communication with the exterior of the aircraft. In detail, the system comprises a plurality of first doors mounted on the aircraft which are movable from an open position to a closed position thereby sealing off a portion of the opening and forming a portion of the external contour of the aircraft over the opening. A frame member having at least one weapon mounting assembly mounted thereto is rotatively mounted within the weapon bay. The weapon mounting assembly is rotatably alignable with the opening upon rotation thereof. A second weapon mounting assembly is mounted to the frame member and is alignable with the opening upon rotation of the frame member. The second weapon mounting assembly comprises a pair of second doors rotatively mounted to the frame member. The pair of second doors is movable from an open position to a closed position so that the remaining portion of the opening is sealed off and forms the remaining portion of the external contour of the aircraft. A missile ejector assembly is mounted to at least one of the second door system for moving the missile from a retracted position to an extended position so that the missile can be launched when the second door system is in the open position.

4 Claims, 6 Drawing Figures

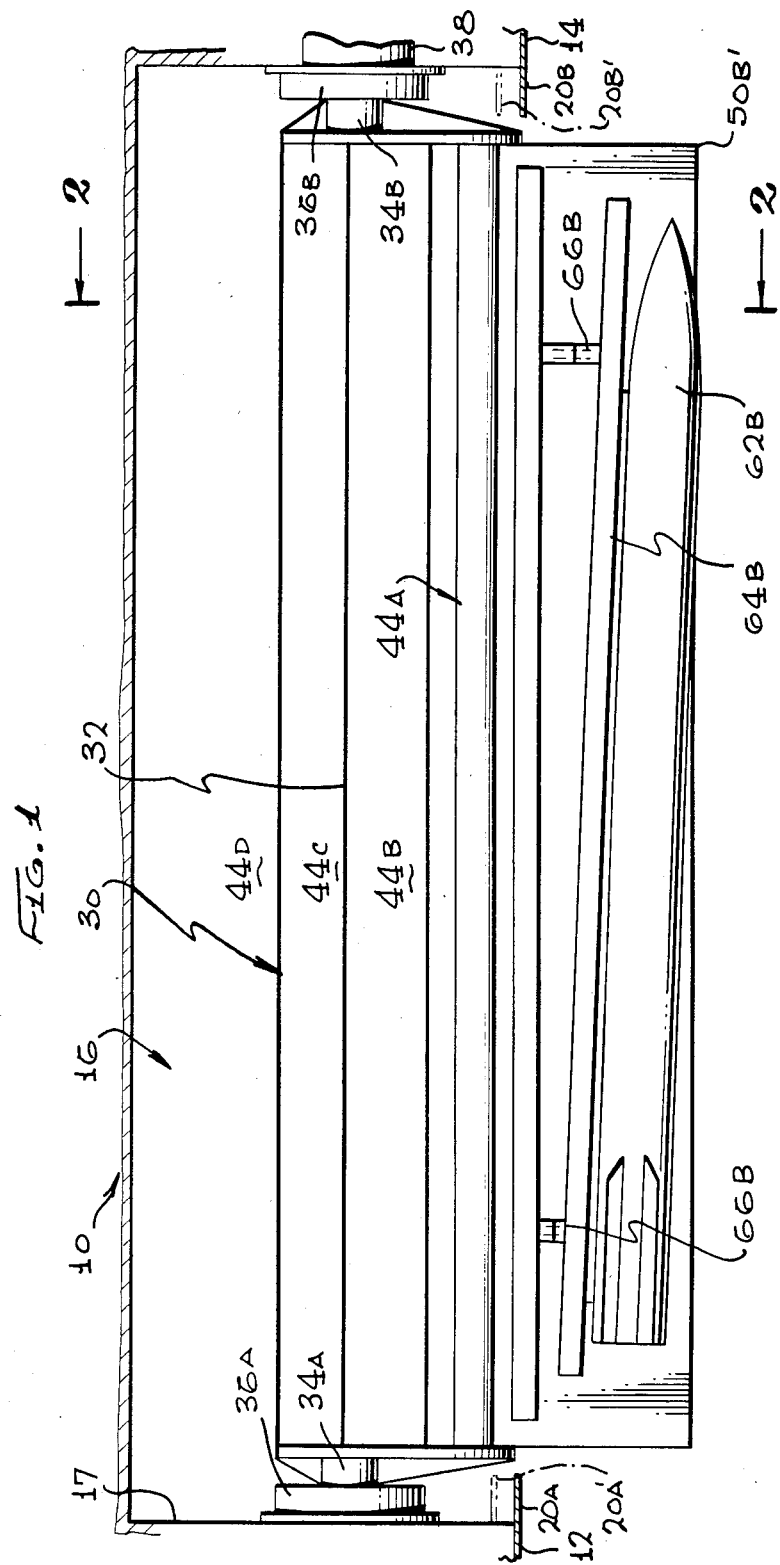

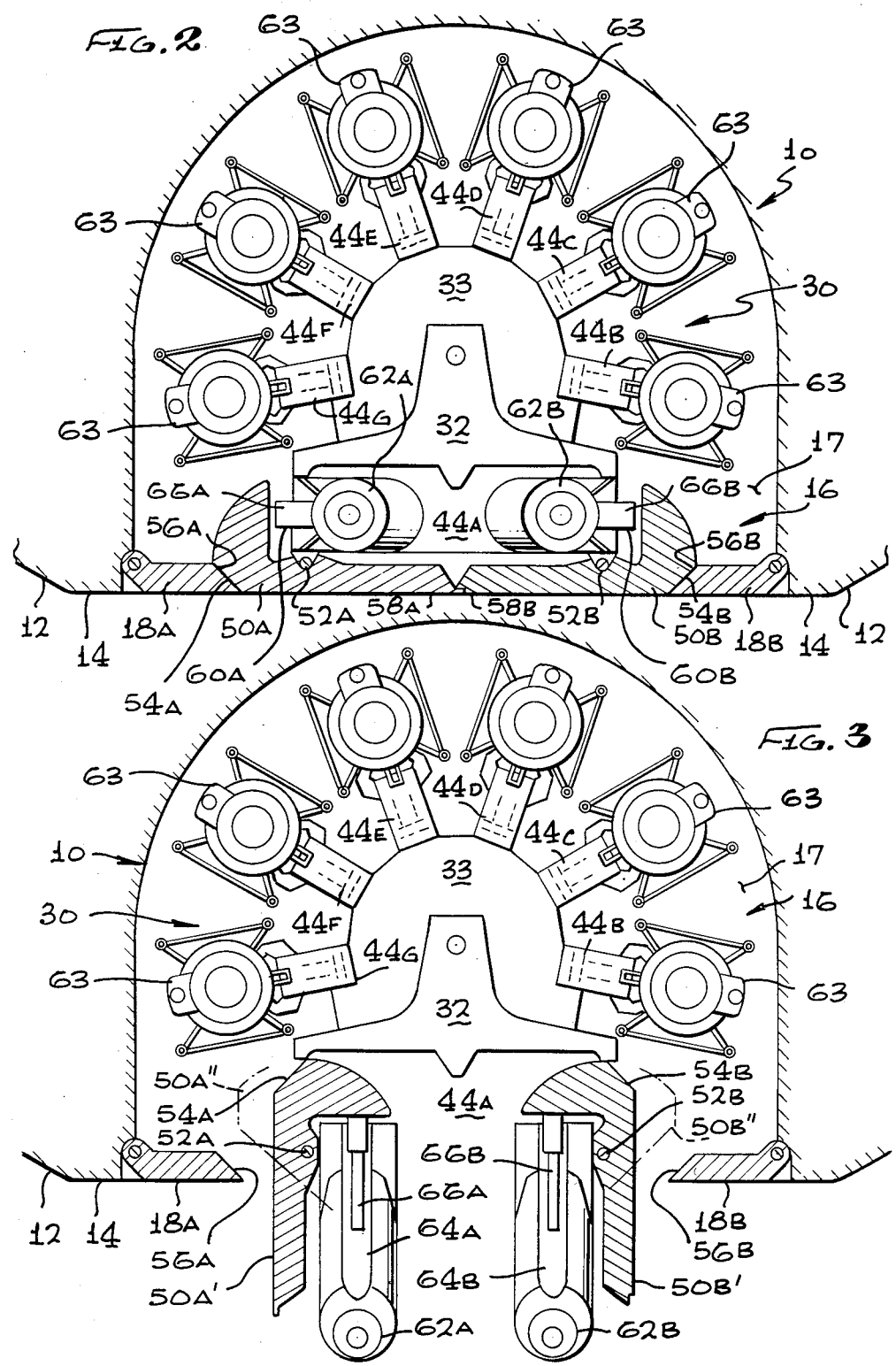

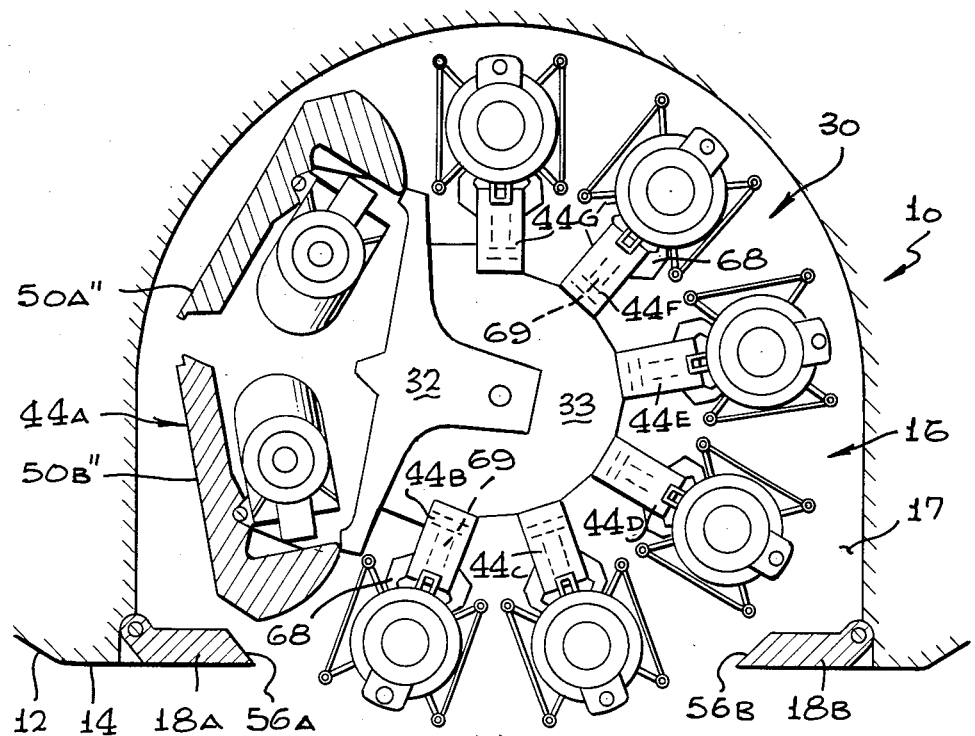
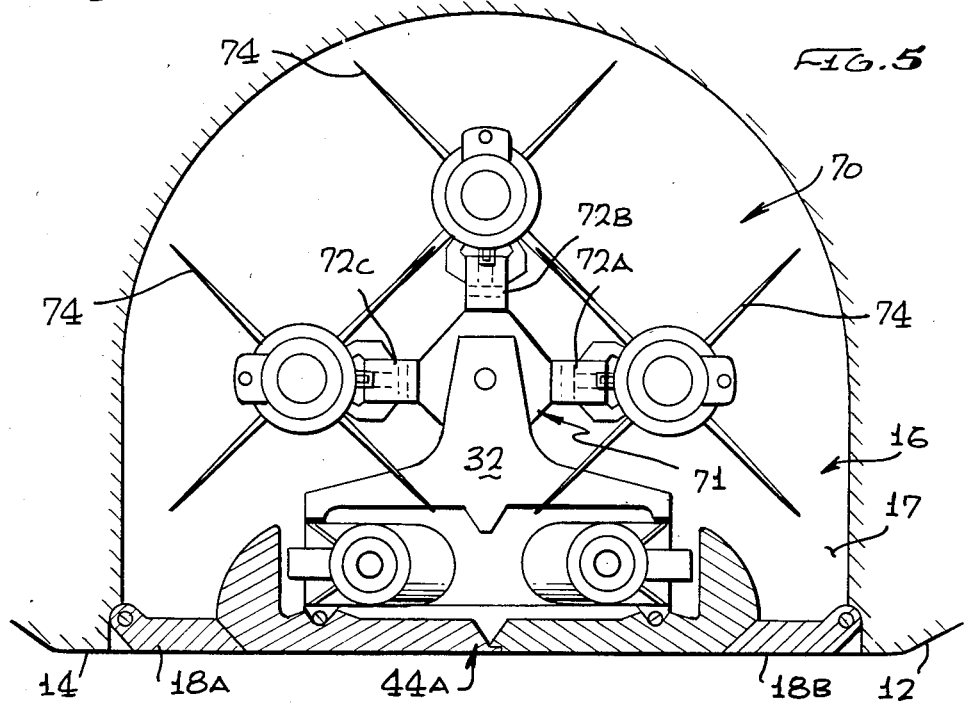

ROTARY LAUNCHER SYSTEM FOR AN AIRCRAFT

TECHNICAL FIELD

The invention relates to the field of weapon dispensing systems and, in particular, to a rotary missile launching system.

BACKGROUND INFORMATION

Rotary missile launchers, as disclosed in U.S. Pat. No. 4,475,436 "Missile Launcher" by D. R. Campbell, provide for the internal storage of a relatively large number of missiles in a confined space and provide the ability to precisely position the weapon for ejection. This layout allows the use of a smaller weapon bay than would be required when using conventional bomb racks. As a result, the opening in the fuselage need only be slightly larger than that of the individual missile. The problem is that even a small opening will allow a considerable amount of air turbulence into the weapon bay, especially if the aircraft is at near sonic or supersonic speeds. The turbulence can cause high structural loads to be placed on the missiles, the launcher itself and any hydraulic and/or electrical equipment located within the weapon bay. Another problem is the dramatic increase in the radar cross-section of the aircraft, along with an increase in aerodynamic drag when the weapon bay doors are open.

Presently existing rotary launchers are only designed for use with missiles that are ejected from the aircraft prior to ignition of the rocket motor or jet engine. No privision exists for missiles that must be rail or tube launched. U.S. Pat. No. 4,040,334, "Missile Launcher for Aircraft by R. G. Smithers, Jr., however, does disclose a rotary launcher mounted within an aircraft which aligns a missile with a launch tube exiting the nose of the aircraft. The problem here is that the length of the launch tube must extend from the weapon bay to the nose of the aircraft taking up a considerable amount of space within the aircraft. Thus, such a system is appropriate for a large bomber type aircraft but would be impractical on a small tactical aircraft.

It should also be noted that some early jet fighters incorporated extendable flush mounted pods on the underside of the aircraft which carried small, two to three inch diameter unguided rockets which were typically fired in salvo. Another approach was to incorporate launch tubes in weapon bay doors. Again, the missiles were small in diameter and unguided. The disadvantage of such systems is that the doors are extremely large, increasing the drag and radar cross-section of the aircraft when extended.

In U.S. patent application Ser. No. 799,089 "Rotary Launcher System for an Aircraft" by Farley et al., (common assignee), filed Nov. 26, 1985, the possibility of air turbulence damaging the interior of the weapon bay was reduced along with a reduction of the radar cross-section. This system was designed for use with an aircraft having a weapon bay with an opening in communication with the exterior of the aircraft. A plurality of doors are mounted on the aircraft movable from an open position to a closed position so that the doors seal off part of the opening and form a portion of the external contour of the aircraft.

A rotary launcher assembly including a rotatively mounted frame member therein is mounted within the weapon bay. A plurality of weapon mounting assemblies are attached at discrete locations to the frame member and are sequentially alignable with the opening. Barrier assemblies are mounted on the frame member. When any one of the plurality of weapon mounting assemblies is aligned with the opening the barrier assemblies cooperate with the plurality of doors sealing off the weapon bay from the exterior of the aircraft. This system includes a cover assembly mounted to the weapon mounting assembly for covering the remaining portion of the opening and for cooperating with the plurality of doors to form a portion of the external contour extending completely over the opening. Thus, aerodynamic drag and radar cross-section are reduced even when a missile is ready to be launched. This system, however, is limited by the type of missiles that can be carried and in particular, at least one of the weapon mounting assemblies was required to have tube launched folded fin missiles in order to provide the reduced radar cross-section.

Other patents of interest U.S. Pat. No. 4,333,384, "Rotary Rack Launcher with Direct Load Path Suspension" by A. M. Arnold, U.S. Pat. No. 3,228,295, "Guided Missile Launching System" by G. A. Kane et al., U.S. Pat. No. 2,447,941, "Aerial Bombs, Pyrotechnic Devices and the Like" by J. Imber et al., and U.S. Pat. No. 2,646,786, "Cylindrical Object Ejecting Apparatus" by F. H. Robertson.

Therefore, it is a primary object of the subject invention to provide a rotary missile launching system for an aircraft, wherein the missiles and their suspension and release devices can be easily installed and removed from the launcher thus increasing the sortie rate of the aircraft.

Another primary object of the subject invention is to provide a rotary launcher system, wherein both folded and non-folded fin missiles can be carried.

It is a further object of the subject invention to provide a missile launching system for an aircraft that does not require the opening of the weapon bay doors to launch a missile.

A still further object of the subject invention is to provide a rotary missile launching system for an aircraft which is capable of both ejector and rail launching of a missile.

Another object of the subject invention is to provide a missile launching system that provides a reduced radar cross-section during a missile launch cycle.

DISCLOSURE OF THE INVENTION

The invention is a rotary launcher system for an aircraft having a weapon bay, which has an opening in communication with the exterior of the aircraft. In detail, the system comprises a plurality of first doors mounted on the aircraft which are movable from an open position to a closed position thereby sealing off a portion of the opening and forming a portion of the external contour of the aircraft over the opening. A frame member having at least one weapon mounting assembly mounted thereto is rotatively mounted within the weapon bay. The weapon mounting assembly is rotatably alignable with the opening upon rotation thereof.

A second weapon mounting assembly is mounted to the frame member and is alignable with the opening upon rotation of the frame member. The second weapon mounting assembly comprises a pair of second door means rotatively mounted to the frame member.

The pair of second door means is movable from an open position to a closed position so that the remaining portion of the opening is sealed off forming the remaining portion of the external contour of the aircraft. A missile launch mechanism assembly is mounted to at least one of the second door means for moving the missile from a stowage position to an extended position so that the missile can be launched when the second door means is in the open position.

The novel features which are believed to be characteristic of the invention both as to its organization and method of operation, together with further objects and advantages thereof, will be better understood from the following description in connection with the accompanying drawings in which presently preferred embodiments of the invention are illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a partial side elevation view of an aircraft incorporating the rotary missile launching system.

Illustrated in FIG. 2 is a cross-sectional view of an aircraft weapon bay shown in FIG. 1 along the line 2—2.

Figure 6:
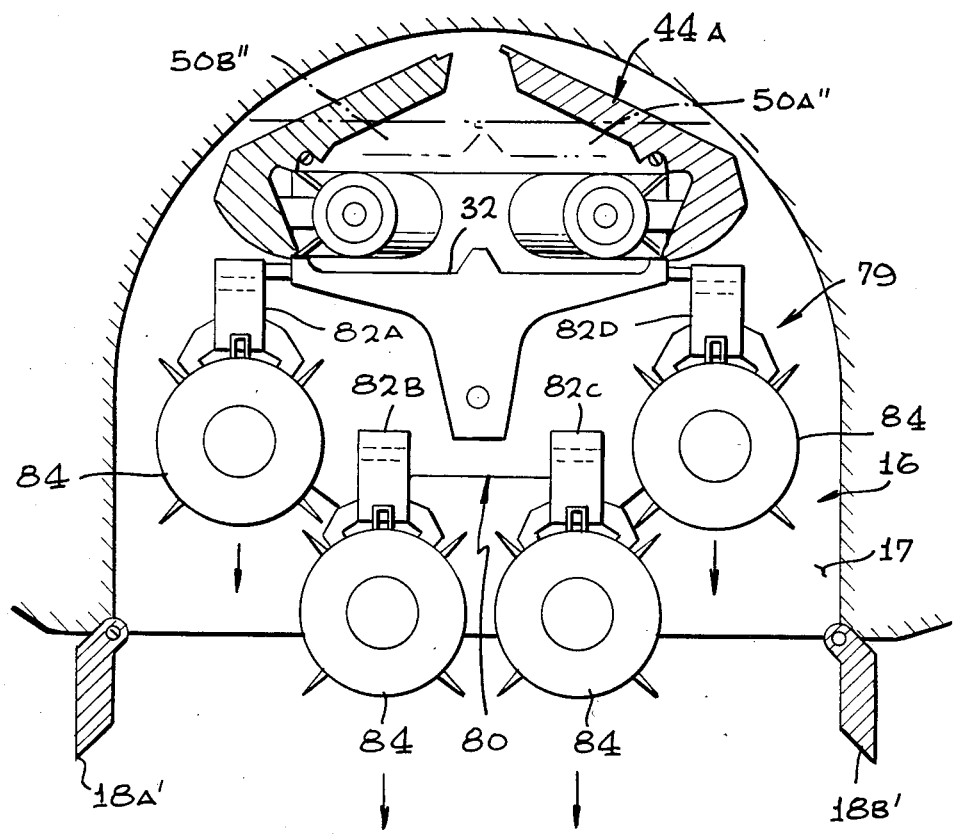

Illustrated in FIG. 3 is a cross-sectional view similar to FIG. 2 showing a first set of missiles in an extended and ready-to-launch position.

Illustrated in FIG. 4 is a cross-sectional view similar to FIG. 2 showing the rotary launcher rotated so that a second set of missiles are in ready to launch position.

Illustrated in FIG. 5 is a cross-sectional view of a weapon bay similar to FIG. 2 showing non-folded fin missiles mounted to the rotary launcher.

Illustrated in FIG. 6 is a cross-sectional view of the weapon bay shown in FIG. 2 showing a third embodiment of the rotary launcher carrying bombs or other munitions in combination with door mounted missiles.

BEST MODE FOR CARRYING OUT THE INVENTION

Referring to FIGS. 1 through 4 it can be seen that the aircraft, generally designated by numeral 10, has an external contour 12 which is substantially flat at the bottom or underside 14. This flat underside was selected for purposes of illustration and it must be understood that the bottom contour could be curved as dictated by aerodynamic or radar cross-section concerns. The aircraft 10 has an internal weapon bay 16 in communication with the exterior of the aircraft by means of opening 17. Side doors 18A and 18B and fore and aft doors 20A and 20B, respectively, are mounted about the opening 17 and are movable by actuators (not shown) from a closed position where they partially seal off the opening 17 and form a portion of the external contour 12 of the aircraft to an open position (indicated by numerals 18A', 18B', 20A' and 20B').

Mounted within the weapon bay 16 is a rotary launcher, generally indicated by numeral 30. The rotary launcher 30 comprises a frame member 32 pivotally supported at its fore and aft ends 34A and 34B, respectively, by bearing mounts 36A and 36B, respectively. Mounted to the frame member 32 by conventional fastener means (not shown) is a weapon mounting module 33. A drive motor 38 (either electric or hydraulically powered) is mounted at the aft end for rotating the launcher assembly 30.

The fore and aft doors 20A and 20B, typically powered by conventional hydraulic actuators (not shown), are used for sealing the fore and aft ends of the weapon bay to doors interface. These doors are automatic in operation and move to the unsealed or open position any time the rotary launcher begins to turn, then return automatically to the sealed position when the launcher returns to the position shown in FIG. 2.

Thus, the aircraft is essentially of the "magazine loaded" type. The use of an easily removable module 33 allows the sortie rate to dramatically increase, since other modules can be reloaded while the aircraft is still in the air. Additionally, the aircraft can easily be adapted for other missions, since, an entirely different set of weapons can be loaded in alternate modules.

The frame member 32 has a weapon support assembly 44A attached thereto while weapon mounting assembly is 44B, 44C, 44D, 44E, 44F and 44G are attached to module 33 at discrete intervals and are sequentially alignable with opening 17. Particularly referring to the weapon mounting assembly 44A it can be seen that this assembly embodies a pair of doors 50A and 50B rotatably mounted to the frame member 32. The doors are rotated about pivot axes 52A and 52B, respectively. In the closed position the ends 54A and 54B of the doors 50A and 50B, respectively, mate with the ends 56A and 56B of the doors 18A and 18B, respectively. The opposite ends 58A and 58B also mate together when the doors are in the closed position. Thus, the weapon bay 16 is completely sealed off when the doors 18A, 18B, 20A, 20B, 50A and 50B are in the closed positions. Launch rack assemblies 60A and 60B are mounted to each door 50A and 50B which mount rail launched folded fin missiles 62A and 62B. The launch rack assemblies comprise rails 64A and 64B on which missiles 62A and 62B, respectively, are mounted.

Referring now, particularly to FIGS. 1 and 3, when the doors 50A and 50B are rotated to the open position (50A' and 50B') the rails 64A and 64B can be lowered by means of displacement mechanisms 66A and 66B with the front of the rails lower than the rear, thus allowing the missile to clear the aircraft when launched. Also note that when the doors are in the open position the ends 54A and 54B contact the frame member 32 sealing off the interior of the weapons bay 16 from the missiles 62A and 62B. Thus, when the missiles are launched, rocket exhaust gases are prevented from reaching the interior of the weapon bay.

Illustrated in FIG. 4 is the rotary launcher assembly 30 rotated clockwise so that the weapon mounting assembly 44A is in the nine o'clock position. This is accomplished by partially opening the doors 50A and 50B so the doors then assume the positions indicated by numerals 50A" and 50B" and thus are free of the ends 54A and 54B of the doors 18A and 18B, respectfully. With the doors 50A and 50B in the partially open position, weapon mounting assemblies 44B–44G can be brought in alignment with the opening 17 (as shown weapon mounting assemblies 44B and 44C are aligned). Note that after the launch the frame member 32 can be rotated counterclockwise so that the doors 50A and 50B can be rotated to the closed position as shown in FIG. 2. Therefore the weapon bay is exposed to air turbulence for only a short time during the launch of a missile. The increase in radar cross-section is also kept to a minimum.

As illustrated, the missile mounting assemblies 44B-44G are conventional ejector racks which incorporate sway braces 68, displacement mechanisms 69 and mounting hooks (not shown) for folded fin missiles.

Illustrated in FIG. 5 is a second embodiment of the rotary launcher system generally indicated by numeral 70, wherein an alternate module 71 is clipped into mounting assembly 32A. Attached thereto are weapon mounting assemblies 72A, 72B and 72C which are similar to weapon mounting assemblies 44B, but mounting non-folded fin missiles 74. This particular embodiment is provided to illustrate that large fin missiles can be carried but with a reduction in their total number.

Illustrated in FIG. 6 is a third embodiment of the rotary launcher assembly, generally indicated by numeral 79, wherein alternate module 80 is clipped into mounting assembly 32A having weapon mounting assemblies 82A, 82B, 82C and 82D attached thereto mounting non folded fin missiles 84. As shown, the missiles mounted to assembly 82B and 82C could be launched with the doors 18A and 18B in the closed position. To launch the missiles mounted to assemblies 82A and 82D the doors 18A and 18B must be placed in the fully open position indicated by numerals 18A' and 18B', respectively. Here again the doors 18A and 18B need only be open when the outer two missiles are to be launched or when the module 80 is being installed. As in the previous embodiments after each missile launch the frame member 32 can be rotated so that the weapon mounting assembly 44A is aligned with the opening thereby reducing air turbulence exposure and reducing radar cross-section.

While the invention has been described with reference to particular embodiments, it should be understood that the embodiments are merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to weapon carrying military aircraft.

I claim:

1. A rotary launcher system for an aircraft having a weapon bay, the weapon bay having an opening in communication with the exterior of the aircraft, the system comprising:

a plurality of first doors mounted on the aircraft movable from an open position to a closed position sealing off a portion of the opening and forming a portion of the external contour of the aircraft over the opening;

a frame member rotatively mounted within the weapon bay;

at least one first weapon mounting assembly mounted to said frame member alignable with the opening upon rotation of said frame member, said at least one first weapon mounting assembly adapted to mount at east one missile;

a second weapon mounting assembly mounted to said frame member alignable with the opening upon rotation of said frame member, said second mounting assembly comprising;

a pair of second door means rotatively mounted to said frame member, said pair of second door means movable from an open position to a closed position wherein said second door means seals off the remaining portion of the opening and form the remaining portion of the external contour of the aircraft over the opening, when said second weapons mounting assembly is aligned with the opening; and, a missile dispensing assembly mounted to at least one of said second door means for moving the missile from a retracted position to an extended position wherein the missile can be launched when said door means is in said open position.

2. The system of claim 1 wherein said pair of second door means is further movable to a partially opened position wherein said second door means is spaced from said first door means when said first door means is in the closed position such that same frame member can be rotated.

3. The system of claim 2 wherein said at least one of said first weapon mounting assemblies incorporate means to eject the at least one missile.

4. The system of claim 3 wherein said pair of second doors cooperate with said frame member providing a barrier between the missiles and the weapon bay when said pair of second doors are in the open position.

* * * * *